United States Patent
Dixon et al.

(10) Patent No.: US 9,928,236 B2
(45) Date of Patent: Mar. 27, 2018

(54) SYSTEMS AND METHODS FOR MULTI-PATH LANGUAGE TRANSLATION

(71) Applicant: McAfee, Inc., Santa Clara, CA (US)

(72) Inventors: Edward Dixon, Cork (IE); Marcin Dziduch, Cork (IE); Craig Olinsky, Paderborn (DE)

(73) Assignee: MCAFEE, LLC, Santa Clara, CA (US)

( * ) Notice: Subject to any disclaimer, the term of this patent is extended or adjusted under 35 U.S.C. 154(b) by 0 days.

(21) Appl. No.: 14/858,470

(22) Filed: Sep. 18, 2015

(65) Prior Publication Data

US 2017/0083510 A1   Mar. 23, 2017

(51) Int. Cl.
*G06F 17/20*   (2006.01)
*G06F 17/21*   (2006.01)
*G06F 17/27*   (2006.01)
*G06F 17/28*   (2006.01)
*G10L 21/00*   (2013.01)
*G10L 25/00*   (2013.01)

(52) U.S. Cl.
CPC ...... *G06F 17/2836* (2013.01); *G06F 17/2818* (2013.01)

(58) Field of Classification Search
None
See application file for complete search history.

(56) References Cited

U.S. PATENT DOCUMENTS

| | | | | |
|---|---|---|---|---|
| 5,227,971 A * | 7/1993 | Nakajima | .......... | G06F 17/2735 704/2 |
| 6,286,130 B1 * | 9/2001 | Poulsen | .......... | G06F 8/10 717/119 |
| 6,728,695 B1 * | 4/2004 | Pathria | .......... | G06F 17/2715 |
| 7,124,073 B2 * | 10/2006 | Tokuda | .......... | G06F 17/2765 704/2 |
| 7,620,539 B2 * | 11/2009 | Gaussier | .......... | G06F 17/2735 704/10 |
| 7,672,830 B2 * | 3/2010 | Goutte | .......... | G06F 17/2827 704/2 |

(Continued)

FOREIGN PATENT DOCUMENTS

WO   2012170817 A1   12/2012

OTHER PUBLICATIONS

International Search Report and Written Opinion for PCT Application No. PCT/US2016/043826 completed Oct. 31, 2016, 11 pages.

*Primary Examiner* — Richemond Dorvil
*Assistant Examiner* — Thuykhanh Le
(74) *Attorney, Agent, or Firm* — Hanley, Flight & Zimmerman, LLC

(57) ABSTRACT

Systems, apparatus, computer-readable media, and methods to provide translation of words or phrases from an initial language to a target language using multiple pathways are disclosed. The multiple pathways may have independent or near independent errors and the use of multiple pathways may reduce the errors that may be encountered in semantic vector based language translation. Cost values may be determined for translation to various potential words in the target language based at least in part on the multiple translation pathways between the initial language and the final language. The cost values may be used to select from among the various potential words in the target language.

20 Claims, 8 Drawing Sheets

(56) References Cited

U.S. PATENT DOCUMENTS

| | | | |
|---|---|---|---|
| 7,765,098 B2* | 7/2010 | Bradford | G06F 17/2809 |
| | | | 704/2 |
| 9,431,003 B1* | 8/2016 | Cecchi | G10L 13/033 |
| 9,734,144 B2* | 8/2017 | Dascălu | G06F 17/2785 |
| 2003/0105632 A1* | 6/2003 | Huitouze | G10L 15/1815 |
| | | | 704/246 |
| 2006/0009963 A1* | 1/2006 | Gaussier | G06F 17/2735 |
| | | | 704/7 |
| 2008/0221864 A1 | 9/2008 | Blumenthal | |
| 2008/0221892 A1* | 9/2008 | Nathan | G06F 17/279 |
| | | | 704/257 |
| 2009/0248394 A1 | 10/2009 | Sarikaya et al. | |
| 2010/0229120 A1* | 9/2010 | Inoue | G06F 3/0482 |
| | | | 715/811 |
| 2010/0268526 A1 | 10/2010 | Bradford | |
| 2013/0159320 A1* | 6/2013 | Gao | G06F 17/30867 |
| | | | 707/748 |
| 2014/0081941 A1* | 3/2014 | Bai | G06F 17/30011 |
| | | | 707/706 |
| 2015/0081273 A1 | 3/2015 | Kabushiki | |
| 2015/0161513 A1* | 6/2015 | Li | G06N 5/04 |
| | | | 706/11 |
| 2016/0283467 A1* | 9/2016 | Dascalu | G06F 17/30106 |
| 2017/0032273 A1* | 2/2017 | Ho | G06N 99/005 |

* cited by examiner

SYSTEMS AND METHODS FOR MULTI-PATH LANGUAGE TRANSLATION

TECHNICAL FIELD

This disclosure generally relates to systems and methods for language translation, and more particularly to multi-path language translation.

BACKGROUND

In an increasingly globalized world, there are greater needs for rapid and reliable language translations. Computer-based or machine translations may be useful in making quick translations of audio and/or written documents. In some cases, however, machine translations may suffer from inaccuracy. Desired increases in accuracy of translations may take relatively high levels of human resources (e.g., translational time) and/or processing resources.

BRIEF DESCRIPTION OF THE FIGURES

Reference will now be made to the accompanying drawings, which are not necessarily drawn to scale, and wherein.

DETAILED DESCRIPTION OF EMBODIMENTS OF THE DISCLOSURE

Figure 1:
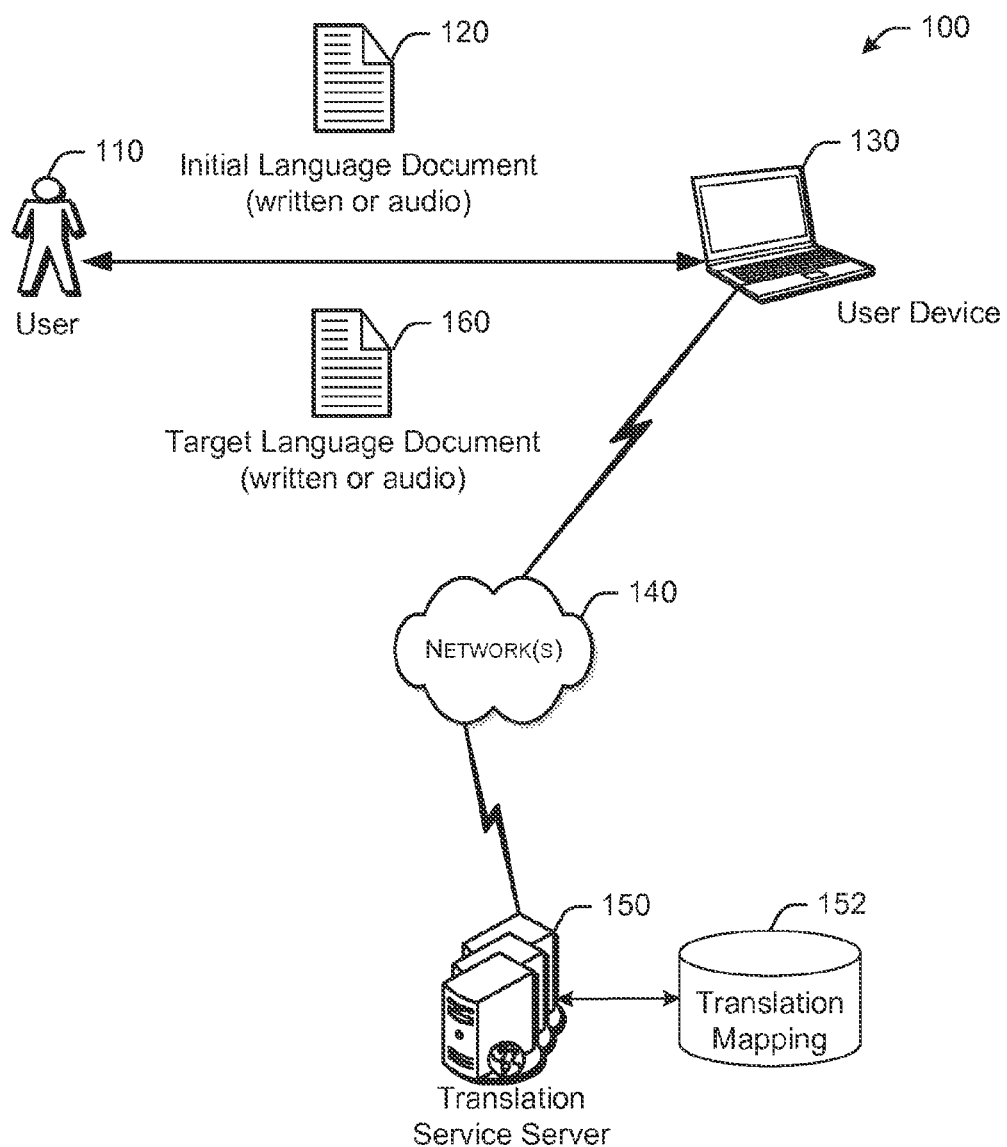
FIG. 1 depicts a simplified schematic diagram of an example environment with a translation service server that provides machine translation services, in accordance with example embodiments of the disclosure.

Embodiments of the disclosure are described more fully hereinafter with reference to the accompanying drawings, in which example embodiments of the disclosure are shown. This disclosure may, however, be embodied in many different forms and should not be construed as limited to the example embodiments set forth herein; rather, these embodiments are provided so that this disclosure will be thorough and complete, and will fully convey the scope of the disclosure to those skilled in the art. Like numbers refer to like, but not necessarily the same or identical, elements throughout.

Embodiments of the disclosure may provide systems, apparatus, computer-readable media, and methods for translating words from one language to another language. In example embodiments, mechanisms involving semantic vector representations of words may be used for the purposes of translating words or phrases between an initial language and a target language. Representing words in a semantic vector space may make use of semantic properties, meanings, and/or definition of the words to represent the words in a vector space (e.g., hyper-dimensional vector space). Similarities in the meaning of two words may be embodied in the relative proximity of the two words in semantic vector space. For example, the words "chicken" and "turkey" may be relatively proximal in semantic vector space, while the words "chicken" and "combustion" may be relatively distal in semantic vector space. The concepts of semantic vector representation of words is described elsewhere, such as, for example, in Mikolov, Tomas, et al. "Efficient Estimation of Word Representations in Vector Space," Cornell University Library, submitted Jan. 16, 2013, World Wide Web link: http://arxiv.org/abs/1301.3781.

The vector representation of words in a semantic vector space in a first language may be used to find translations of words from the first language to a second language using a translation matrix between the first language and the second language. This translation matrix may, in example embodiments, provide a linear or affine transform from the semantic vector space of the first language to semantic vector space of the second language. For example, if one takes the semantic vector representation of the French word "pomme" (French for apple) in French semantic vector space, and multiplies that semantic vector by the French-to-English translation matrix, then the resulting semantic vector in the English semantic vector space, assuming minimal errors in the French-to-English matrix, may be relatively close to the English vector representation of the word "apple."

Semantic vector representations of a corpus of words of a first language may be generated in the semantic vector space of that first language. Similarly, semantic vector representations of a corpus of words in a second language may be generated in the semantic vector space of the second language. As a non-limiting example, the semantic vector space of the first language and the second language may each have 300 dimensions (e.g., 300 independent orthogonal unit vectors). Thus, in this example, a semantic vector representation of a word in either of the two languages may comprise a scalar value corresponding to each of the 300 independent orthogonal unit vectors (e.g., the semantic vector of the word may be represented as a 300×1 matrix). The semantic representations of each of the dimensions of the first language semantic vector space may be different from the semantic representations of each of the dimensions of the second language vector space. In other words, a particular word in the first language and its translation in the second language may have different vector representations in each of their respective semantic vector space. Indeed, in some example embodiments, the first language semantic vector space and the second language semantic vector space may not even have the same dimensionality. As a non-limiting example, the semantic vector of the word "elephant" in the English semantic vector space may be quite different than the semantic vector of the word "elefante" (Italian for elephant) in the Italian semantic vector space, even though both words in both linguistic vector spaces may be represented by 300 dimensions. It will be appreciated that the dimensionality of 300 of the semantic vector spaces of various languages were selected only by way of example. Indeed the semantic vector spaces of the various languages may have any suitable number of dimensions, such as 100, 150, 263, 600, 1000, or the like.

After semantic vectors of a corpus of words have been determined in both the first language and the second language, a set of seed words (e.g., 1000 words) may be mapped between the first and the second languages to determine a translation matrix between the first and the second languages. In example embodiments, these seed words may be known translations (e.g., word mappings) between the first language and the second language. The translation matrix between the first language and the second language semantic vector spaces may be such that multiplying a semantic vector representation of a word in the first language by the translation matrix between the first and second languages may result in a semantic vector in the second language semantic vector space that is close to the semantic vector of the translation of the word. For example, if the semantic vector of "elephant" in the English semantic vector space is multiplied by the English-Italian translation matrix, then the resulting semantic vector may be relatively close to the semantic vector for the word "elefante" in the Italian semantic vector space, assuming that errors in the English-Italian translation matrix are relatively small. In example embodiments, the translation matrix between two languages may have a dimensionality based on the dimensionality of the semantic vector space of the two languages. For example, if both the first language and the second language semantic vector space have a dimensionality of 300 dimensions, then the translation matrix between the first and second language semantic vector space may have dimensions of 300×300.

It will be appreciated that the translation matrix between two languages may be calculated using seed words that may be a subset, and in some cases, a relatively small fraction, of the corpus of words for which semantic vector representations may exist in each of the two languages. As a result, in example embodiments, errors may exist in the translation matrix between the two languages. These errors, in example embodiments, may manifest themselves as islands of relatively greater errors in spaces that are relatively distal from the seed words used to generate the translation matrix between the two languages. If a translation matrix with errors are used for the purpose of translating a word or phrase from a first language to a second language, depending on the magnitude and location of the errors (e.g., the hyper-volumetric distribution of the errors within the semantic vector spaces and/or the translation matrix), errors in translating the word or phrase form the first language to the second language may arise.

Errors that may arise, in example embodiments, may be of relatively higher magnitude if the translation matrix between the two languages is based on an insufficient number of training words (e.g., seed words that are mapped between the two languages) or if one or both of the semantic vector space(s) have insufficient dimensionality. The process of training using the seed words to determine the translation matrix between two languages may, in example embodiments, be relatively processing bandwidth and/or human labor intensive. As a result, translation matrices between language pairs may exist that inject errors in mapping words between languages. As a non-limiting example of a translation error that may arise, consider the process of translating the word "olla" (Spanish for pot) to English. Multiplying the semantic vector for "olla" in Spanish semantic vector space by a Spanish-to-English semantic space translation matrix may result in a vector in English semantic vector that is relatively close to the semantic vectors for the words "pot," "pan," and "griddle." Proximity in the hyper-volumetric space may be based on a variety of calculations, such as a cosine distance, sine distance, cosine similarity, Euclidean distance, correlation, combinations thereof, or the like. Next, the procedure may determine the distance to each of these words and determine that the translation matrix based transformation of the semantic vector for "olla" is most proximate to the semantic vector for the word "pan," rather than the semantic vector for the word "pot." As a result, this procedure may erroneously deem the translation and/or mapping of the Spanish word "olla" as the English word "pan." The systems, methods, apparatus, and non-transitory computer readable media, as described herein may address issues with translation errors in translating words from one language to another using semantic vector space mapping techniques.

It will be appreciated that when determining translation matrices between different language pairs, the errors that may arise in the translation of words, or the semantic vector representation thereof, between any two languages may be largely independent of and/or relatively weakly correlated to the errors that may arise in a the translation between a different pair of languages. As disclosed here, the relatively independent nature of the errors that arise between any two pairs of linguistic translations may be exploited to generate a more accurate translation of a word or phrase from an initial language to a target language. In example embodiments, the relative independence of errors arising from multiple paths for translating a word or phrase from the initial language to the target language may provide a mechanism to reduce the errors in the mapping of the word or phrase.

In example embodiments, the translation of a word or phrase from an initial language to a target language may employ one or more intermediary language translations. For example, it may be desired to translate a word from an initial language to a target language. In this case, the semantic vector representation of the word in the initial language may be transformed to the semantic vector representation in the target language (e.g., by multiplying by the translation matrix between the first language and the second language). In addition, the semantic vector of the word in the initial language semantic vector space may be transformed to a semantic vector in an intermediary language, such as by multiplying by the translation matrix between the initial language and the intermediary language. The semantic vector in the intermediary language may further be transformed into a semantic vector of the word in the target language, such as by multiplying by the translation matrix between the intermediary language and the target language. The semantic vector of the word in the target language semantic vector space, as directly transformed from the initial language semantic vector space, is unlikely to be exactly equal to the semantic vector of the word derived via the intermediary language, since the errors that arise via the two separate paths are independent, or are at least not exactly the same. At this point the two separate semantic vectors of the word in the target language space may be employed to provide a translation for the word in the target language. In some example embodiment, the two semantic vectors in the target language space may be averaged to identify the translation. In other example embodiments, a cost function between candidate target words in the target language and the semantic vector representation of the word in the target space may be determined. The resulting cost values may be compared to determine the translated word in the target language to be mapped to the word in the initial language to be translated. The preceding example is described using a single intermediary language to perform the mapping of the word from the initial language to the target language, but it will be appreciated that any suitable number of intermediary languages may be used as a mechanism to improve translation accuracy by introducing multiple translation pathways.

It will be appreciated that the cost function for identifying the translation from two or more potential target words may be any suitable cost function. For example various mechanisms of determining distances in hyper-dimensional space, such as cosine distance or Euclidean distance, may be employed. In example embodiments, the cost function may have different weightings ascribed to various pathways. In some example embodiments, the direct pathway (e.g., initial language to target language pathway) may be more heavily weighted in the cost function. In other example embodiments, the direct pathway may be less heavily weighted than the indirect pathways. In still further example embodiments, a pathway where the translation word has been mapped (e.g., either in a training phase with the set of seed words or subsequently mapped) may be accorded a greater weight than pathways without any translational legs where the word to be translated has previously been mapped. In yet further example embodiments, language pathways with the same or similar written script may be accorded a greater weight than translation pathways that do not have written script consistency. For example, consider translating a word in Hindi (Devanagari script) to Bengali (Devanagari script). A Hindi-Gujrati (Devanagari script)-Bengali pathway may be accorded a greater weight than a Hindi-Tamil (not Devanagari script)-Bengali pathway. In still further example embodiments, similar language groups may be weighted more heavily than pathways with dissimilar linguistic family pathways. Consider, for example, translating a word from Italian (Romance language) to Portuguese (Romance language). An Italian-French (Romance language)-Portuguese pathway may be more heavily weighted than an Italian-German (not a Romance language)-Portuguese pathway. It should be noted that the example differential weightings in cost functions are examples. In other example embodiments, the weightings may be reversed, different, and/or combinations of those described above. In still further example embodiments, different pathways, and the errors associated therewith, may not be differentially weighted in the cost function(s) that may be used to select a target translated word for mapping purposes.

In example embodiments, the errors that are discovered in the process of mapping words or phrases from an initial language to a target language may then be used to modify and/or improve the translation matrix between the initial language and the target language. Any variety of error minimization mechanisms may be used to tweak one or more components of the translation matrix between the initial language and the target language.

FIG. 1 depicts a simplified schematic diagram of an example environment 100 with a translation service server 150 that provides machine translation services, in accordance with example embodiments of the disclosure. The environment may include a user 110 that desires the translation of a document 120 (e.g., written, electronic, audio, etc.) in an initial language to a document 160 in a target language. The environment 100 may further include a user device 130 that may be configured to accept the initial language document 120 from the user 110. For example the initial language document 120 may be input by the user 110 into the user device 130 or received on his/her user device 130, such as by electronic mail (email) or downloaded, to an account associated with the user 110.

In example embodiments, the user device 130 may be any suitable communications device including, but not limited to, a mobile phone, a smartphone, a tablet computing device, an electronic book (ebook) reader, wearable devices, netbook computers, notebook computers, laptop computers, desktop computers, personal digital assistants (PDA), web-enabled televisions, video game consoles, set top boxes (STB), smart appliances, cameras, navigation systems, in-vehicle infotainment systems, combinations thereof, or the like.

The user device 130 may further be configured to communicate via one or more network(s) 140 with a translation service server 150. The networks 140 may include any one or a combination of different types of suitable communications networks, such as cable networks, the Internet, wireless networks, cellular networks, and other private and/or public networks. Furthermore the networks 140 may include any variety of medium over which network traffic is carried including, but not limited to, coaxial cable, twisted wire pair, optical fiber, hybrid fiber coaxial (HFC), microwave terrestrial transceivers, radio frequency communications, satellite communications, or combinations thereof. It is also noted that the described techniques may apply in other client/server arrangements, as well as in non-client/server arrangements (e.g., locally stored software applications, etc.). The user device 130 may be configured to transmit the initial language document 120 on behalf of the user 110 to the translation service server for the purpose of translation to the target language document 160.

The translation service server 150 may be configured to receive a document 120 in an initial language and provide a translation thereof as a document 160 in a target language. In example embodiments, the translation service server 150 may be configured to provide a mapping of a word in an initial language to its translation in a target language. The translation service server 150 may be configured to determine semantic vector representation of words in any one or more of semantic vector space of various languages. The translation service server 150 may further be configured to use a translation matrix to transform a semantic vector of a word in one semantic vector space to a semantic vector in a different semantic vector space. The translation service server 150 may still further be configured to perform a transform of the semantic vector via multiple pathways (e.g., via one or more intermediary language semantic vector space(s)). In accordance with example embodiments of the disclosure, the translation service server 150 may be configured to determine one or more respective errors (e.g., hyper-volumetric distances) corresponding to various pathways for representing a word in a target language semantic vector space to semantic vector representations of potential translations of that word in the target language. The errors may be determined by any suitable mechanism and/or algorithm, including, but not limited, to cosine distance, sine distance, Euclidean distance, average of distances in along each unit vector, sum of squares of distance, sum of absolute value of distance, combinations thereof, or the like.

The translation service server 150 may still further be configured to provide a cost value corresponding to each of the potential translations in the target language based at least in part on the errors calculated for each of the translation pathways (e.g., direct pathway, via one intermediate language, via more than one intermediate language, etc.). The translation service server may be configured to determine the cost values based at least in part on a cost function or cost model. The cost function may be any suitable combination of the errors corresponding to each of the potential translation words in the target language. The cost function may be a un weighted sum of the errors via each pathway, a weighted sum of errors along each pathway, a product of the errors along each pathway, a sum of the squares of the errors along each pathway, a weighted sum of the squares of the errors along each pathway, combinations thereof, or the like. Based at least in part on determined cost values, the translation service server 150 may be configured to deem one of the potential translations as the translation word in the target language. In example embodiments, the potential translation word in the target language that yields the lowest cost value of all of the potential translation words may be mapped as the translation word in the target language to the word to be translated in the initial language. In example embodiments, once the translation service server 150 identifies a translation of a word or phrase from an initial language to a target language, the translation service server 150 may be configured to store that word mapping in a translation mapping datastore 152. The translation service server 150 may also be configured to provide the translation mapping information to the user device 130, such as for the purpose of rendering to the user 110.

Figure 2:
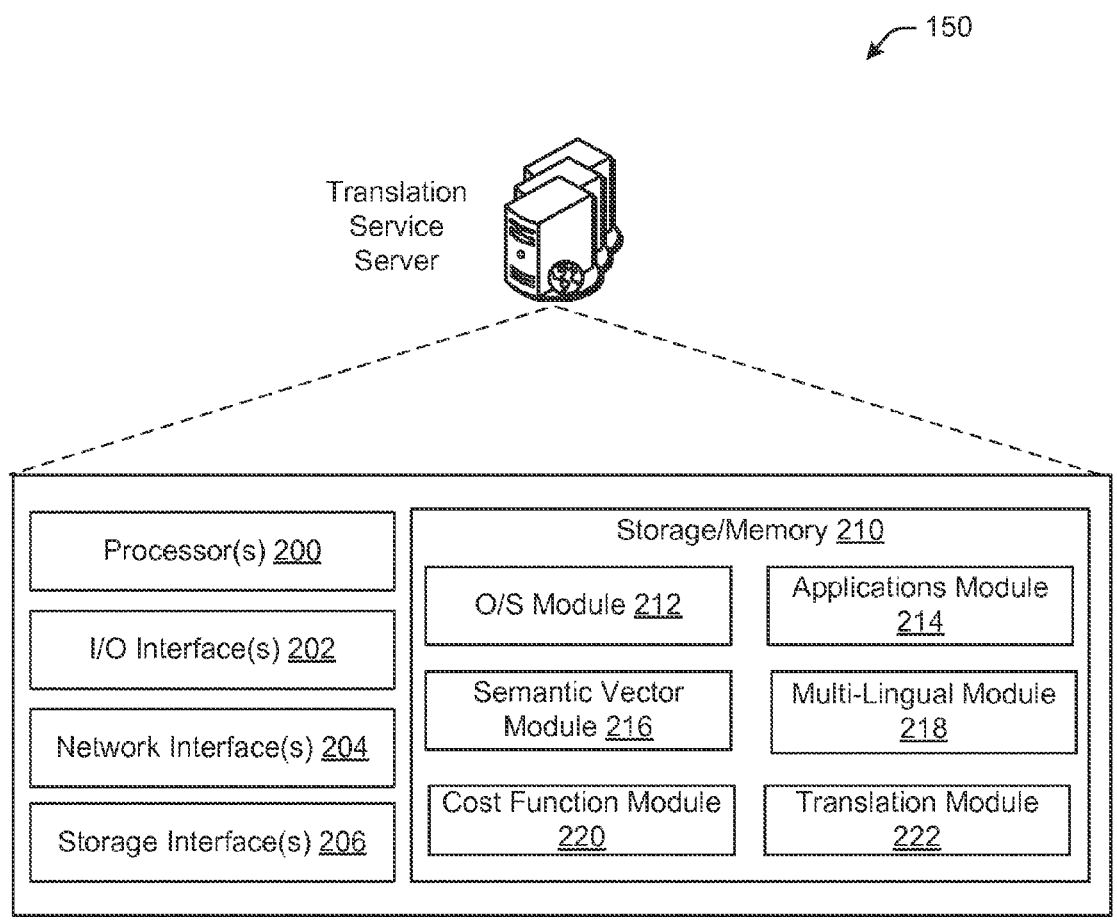
FIG. 2 depicts a simplified block diagram illustrating an example translation service server of FIG. 1, in accordance with example embodiments of the disclosure.

FIG. 2 depicts a simplified block diagram illustrating an example translation service server 150 of FIG. 1, in accordance with example embodiments of the disclosure. The translation service server 150 may include one or more processor(s) 200, one or more I/O interface(s) 202, one or more network interface(s) 204, one or more storage interface(s) 206, and one or more memory or storage 210.

The processors 200 of the translation service server 150 may be implemented as appropriate in hardware, software, firmware, or combinations thereof. Software or firmware implementations of the processors 200 may include computer-executable or machine-executable instructions written in any suitable programming language to perform the various functions described. Hardware implementations of the processors 200 may be configured to execute computer-executable or machine-executable instructions to perform the various functions described. The one or more processors 200 may include, without limitation, a central processing unit (CPU), a digital signal processor(s) (DSP), a reduced instruction set computer (RISC), a complex instruction set computer (CISC), a microprocessor, a microcontroller, a field programmable gate array (FPGA), or any combination thereof. The translation service server 150 may also include a chipset (not shown) for controlling communications between one or more processors 200 and one or more of the other components of the translation service server 150. The processors 200 may also include one or more application specific integrated circuits (ASICs) or application specific standard products (ASSPs) for handling specific data processing functions or tasks. In certain embodiments, the translation service server 150 may be based on an Intel® Architecture system and the one or more processors 200 and chipset may be from a family of Intel® processors and chipsets, such as the Intel® Atom® processor(s) family or Intel-64 processors (e.g., Sandy Bridge®, Ivy Bridge®, Haswell®, Braodwell®, Skylake®, etc.).

The one or more I/O interfaces 202 may enable the use of one or more (I/O) device(s) or user interface(s), such as a keyboard and/or mouse. The network interface(s) may enable the translation service server 150 to interface with and communicate via the network(s) 140 or other communicative links. The storage interface(s) 206 may enable the translation service server 150 to store information, such as word or phrase mapping information, seed word data sets, semantic vector representations of various words in various language vector spaces, or the like. Such data and/or information may be stored and accessed, via the storage interface(s) 206, in storage devices and/or memory 210 and/or translation mapping datastore 152.

The memory 210 may include one or more volatile and/or non-volatile memory devices including, but not limited to, magnetic storage devices, read only memory (ROM), random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), universal serial bus (USB) removable memory, or combinations thereof.

The memory 210 may store program instructions that are loadable and executable on the processor(s) 200, as well as data generated or received during the execution of these programs. Turning to the contents of the memory 210 in more detail, the memory 210 may include one or more operating systems (O/S) 212, an applications module 214, a semantic vector module 216, a multi-lingual module 218, a cost function module 220, and a translation module 222. Each of the modules and/or software may provide functionality for the translation service server 150, when executed by the processors 200. The modules and/or the software may or may not correspond to physical locations and/or addresses in memory 210. In other words, the contents of each of the modules 212, 214, 216, 218, 220, 222 may not be segregated from each other and may, in fact be stored in at least partially interleaved positions on the memory 210.

The O/S module 212 may have one or more operating systems stored thereon. The processors 200 may be configured to access and execute one or more operating systems stored in the (O/S) module 212 to operate the system functions of the electronic device. System functions, as managed by the operating system may include memory management, processor(s) resource management, driver management, application software management, system configuration, and the like. The operating system may be any variety of suitable operating systems including, but not limited to, Google® Android®, Microsoft® Windows®, Microsoft® Windows® Server®, Linux, Apple® OS-X®, or the like.

The application(s) module 214 may contain instructions and/or applications thereon that may be executed by the processors 200 to provide one or more functionality associated with the translation service server 150. These instructions and/or applications may, in certain aspects, interact with the (O/S) module 212 and/or other modules of the translation service server 150. The applications module 214 may have instructions, software, and/or code stored thereon that may be launched and/or executed by the processors 200 to execute one or more applications and functionality associated therewith. These applications may include, but are not limited to, functionality such as web browsing, business, communications, graphics, word processing, publishing, spreadsheets, databases, gaming, education, entertainment, media, project planning, engineering, drawing, or combinations thereof.

The semantic vector module 216 may have instructions stored thereon that, when executed by the processors 200, enable the translation service server 150 to provide a variety functionality associated with determining a semantic vector of words in any variety of semantic vector spaces. In some example embodiments, the processor(s) 200 may be configured to identify the semantic vector of a word that is to be translated. In some cases, the processor(s) 200 may be configured to identify the word from a document, such as the initial language document 120. In some example embodiments, the processor(s) 200 or other entities may have previously determined the semantic vector of the word, such as in the initial language semantic vector space (e.g., as a corpus of words for which semantic vectors were determined) and stored that result in a datastore, such as, for example the translation mapping datastore 152. In these embodiments, the processor(s) 200 may be configured to retrieve the semantic vector of the word to be translated from the datastore where it is stored. In other cases, the word to be translated may not be part of an initial corpus of words for which a semantic vector had been determined. In these embodiments, the processor(s) 200 may be configured to determine the semantic vector of the word in the initial language using any variety of suitable algorithms (e.g., Word2Vec tool, bag-of-words algorithm, continuous skip-gram, latent semantic analysis (LSA), latent dirichlet allocation (LDA), etc.). The processor(s) 200 may be configured to train on an initial corpus of words with defined semantic vectors and then use that training to determine the semantic vectors of other words. In example embodiments, the processor(s) 200 may be configured to perform neural network learning techniques to set up the models using an initial corpus of words that can later be used to determine the semantic vectors of other words.

The multi-lingual module 218 may have instructions stored thereon that, when executed by the processor(s) 200, enable the translation service server 150 to provide a variety of functionality associated with transforming semantic vectors in one linguistic semantic vector space to semantic vectors in other linguistic semantic vector space(s). The processor(s) 200 may be configured to obtain and/or determine translation matrices between various language pairs. These translation matrices may be received from any variety of sources. Alternatively, the processor(s) 200 may be configured to use any suitable algorithms to determine a translation matrix between any two languages. The processor(s) 200 may be configured to use known mappings between words (e.g., seed words) in two languages to determine the translation matrix therebetween, such as by fitting the translation matrix considering errors produced in the transformation of semantic vectors of the seed words. Once the translation matrices are known for the linguistic pairs that may be in the pathway for determining word mappings, the processor(s) 200 may be configured to use those matrices to determine semantic vectors of words in other linguistic semantic vector spaces.

The cost function module 220 may have instructions stored thereon that, when executed by the processor(s) 200, enable the translation service server 150 to provide a variety of functionality in assessing and comparing errors resulting from multiple semantic and/or linguistic pathways for mapping a word from an initial language to a target language. As described above, the processor(s) 200 may be configured to determine a distance (e.g., in a hyper-dimensional/hyper-volumetric sense) for a particular translational pathway to each of one or more candidate translation words in the target language. The processor(s) 200 may be configured to identify the candidate translation words in any suitable mechanism, such as by identifying the words with semantic vectors that are within a predetermined threshold distance of the semantic vector of the word to be translated, as transformed to the target language semantic vector space via a direct route (e.g., initial language to target language transform of the semantic vector of the word in the initial language). Once candidate words in the target language are identified, the processor(s) 200 may be configured to determine the distance to each of those candidate words from a semantic vector representation of the word to be translated in the target language semantic vector space using any variety of suitable techniques. For example, the processor(s) 200 may be configured to calculate a simple sum of the differences in each of the dimensions of the two semantic vectors (e.g., particular pathway transform of the word to be translated to candidate translation word) for which a distance is to be determined. Other mechanisms that the processor(s) 200 may be configured to employ to determine a distance between to semantic vectors may include, but is not limited to, cosine distance, sine distance, angular distance, Euclidean distance, combinations thereof, or the like.

Once the distance between various pathway representations of the word to be translated in the target semantic vector space to candidate translation words are determined, the processor(s) 200 may be configured to use these calculated distances to determine a cost corresponding to each of the candidate translation. In example embodiments, a cost function used to calculate the cost value for each of the candidate translation words may be specified to the translation service server 150 and the processor(s) 200 thereon, such as by the user 110. The cost function, in example embodiments, may use an unweighted sum of the various calculated distances via each pathway for each of the candidate translation words to be compared. In other example embodiments, a weighted sum may be used to combine the distances corresponding to various translational pathways for the candidate translation words for which the cost is being computed. As described above, the weights associated with a weighted cost function may be based on any variety of factors pertaining to the various linguistic pathways for transforming the word to be translated to a semantic vector representation in the target semantic vector space. In still other example embodiments, the cost function for comparing various candidate translation words may involve a product of the distances calculated via each translational pathway.

The translation module 222 may have instructions stored thereon that, when executed by the processor(s) 200, enable the translation service server 150 to provide a variety of functionality pertaining to mapping the word to be translated from the initial language to the target language. After the cost values for each of the candidate translation words in the target language have been determined, such as by the processes enabled by the cost function module 220, as described above, the processor(s) 200 may be configured to select the candidate translation word with the lowest cost as the mapping of the word from the initial language to the target language. After the mapping is determined, the processor(s) 200 may be configured to indicate the mapping of the word between the initial language and the target language. In example embodiments, the processor(s) 200 may be configured to store the word mapping in a datastore, such as the translation mapping datastore 152. The processor(s) 200 may still further be configured to use word mappings to translate the initial document 120 in the initial language to the target language document 160 in the target language.

It will be appreciated that there may be overlap in the functionality of the instructions stored in the operating systems (O/S) module 212, the applications module 214, the semantic vector module 216, the multi-lingual module 218, the cost function module 220, and the translation module 222. In fact, the functions of the aforementioned modules 212, 214, 216, 218, 220, 222 may interact and cooperate seamlessly under the framework of the translation service server 150. Indeed, each of the functions described for any of the modules 212, 214, 216, 218, 220, 222 may be stored in any module 212, 214, 216, 218, 220, 222 in accordance with certain embodiments of the disclosure. Further, in certain embodiments, there may be one single module that includes the instructions, programs, and/or applications described within the operating systems (O/S) module 212, the applications module 214, the semantic vector module 216, the multi-lingual module 218, the cost function module 220, and the translation module 222.

Figure 3:
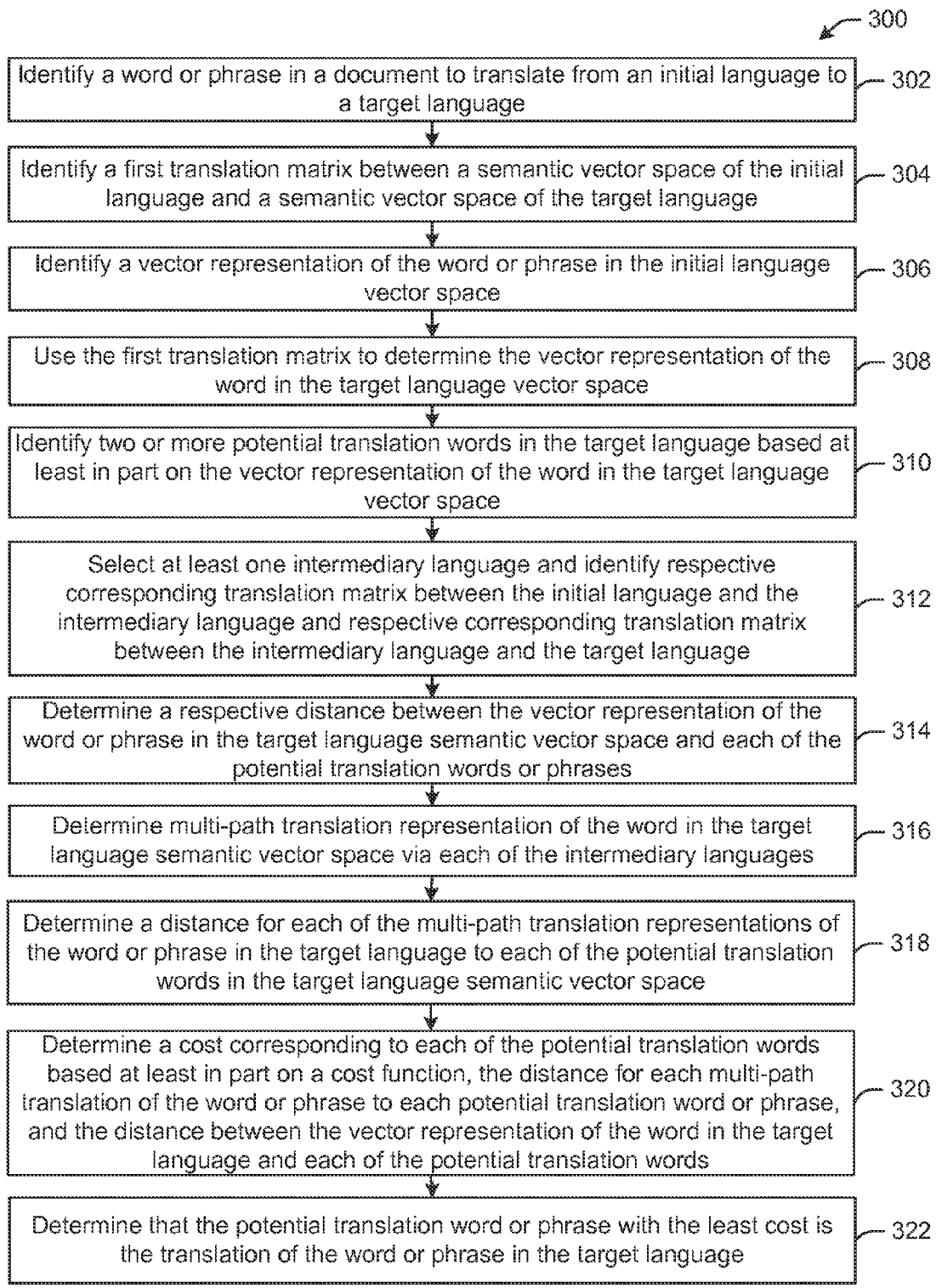
FIG. 3 depicts a flow diagram illustrating an example method for determining a translation of a word from an initial language into a target language by considering the error in the semantic vector space between the word, as translated via multiple paths and candidate words in a target semantic vector space, in accordance with example embodiments of the disclosure.

FIG. 3 depicts a flow diagram illustrating an example method 300 for determining a translation of a word from an initial language into a target language by considering the error in the semantic vector space between the word as translated via multiple paths and candidate words in a target semantic vector space, in accordance with example embodiments of the disclosure. The method 300 may be performed by the translation service server 150 and the processor(s) 200 thereon in cooperation with one or more other entities of the environment 100. In alternative embodiments, the user device 130 may perform one, some or all of the processes of method 300, in accordance with example embodiments of the disclosure.

At block 302, a word or phrase in a document to translate form an initial language to a target language may be identified. In example embodiments, this word or phrase to be translated may not have been previously mapped from the initial language to the target language. In other words, the translation of this word or phrase between the initial language and the target language may not be known. In example embodiments, the word or phrase may not have been part of a set of seed words that may have been used to generate a translation matrix to translate between the initial language and the target language. In some example embodiments, the word to be translated may be part of and/or contained in the initial language document 120.

At block 304, a first translation matrix between a semantic vector space of the initial language and a semantic vector space of the target language may be identified. As described above, this translation matrix may be determined based at least in part on a set of seed words that have been mapped between the initial language and the target language. It will be appreciated that the seed words used to generate the translation matrix may not be exhaustive, and in some cases a relatively small subset of the words for which semantic vectors have been determined. As a result, any transformations using the first translation matrix may not be perfect, and may indeed inject errors, resulting in potentially mapping words erroneously between the initial language and the target language.

At block 306, a vector representation of the word or phrase in the initial language vector space may be identified. This semantic vector of the word to be translated may be determined by finding the semantic vector in a datastore (e.g., a look-up table). Alternatively, the semantic vector of the word in the initial language semantic vector space may be derived using models that may have been trained on an initial corpus of words mapped to their semantic representation.

At block 308, the first translation matrix may be used to determine the vector representation of the word in the target language vector space. It will be appreciated that there may be errors in the target vector space representation of this word or phrase. Indeed, the method 300 may provide a minimization in the error in translation of the word or phrase from the initial language to the target language, where the error may result from errors in transforming the initial language semantic vector to the target language semantic vector for the word or phrase. This process of block 308 provides a direct pathway (e.g., from the initial language to the target language) for transforming the initial language semantic vector to the target language semantic vector.

At block 310, two or more potential translation words in the target language may be identified at least in part on the vector representation of the word in the target language vector space. This process may involve identifying all of the words that have a semantic vector within relative proximity (e.g., in a hyper-volumetric sense) to the direct path target semantic vector of the word, as determined by the processes of block 308. In example embodiments, the two or more potential translation words may be within a threshold distance of the direct path target semantic vector of the word to be translated. This distance, for use in thresholding, may be calculated by any suitable mechanism, such as cosine distance or Euclidean distance, for example. In other example embodiments, the two or more potential translation words in the target language may be identified as a predetermined number of the closest words in the proximity of the direct path target semantic vector of the word to be translated, as determined by the processes of block 308. For example, the three nearest semantic vectors and their corresponding words in the target language semantic vector space to the direct path target semantic vector of the word to be translated may be selected as the two or more potential translation words in the target language. Indeed, any suitable mechanism may be utilized to select the two or more potential translation words, in accordance with example embodiments of the disclosure. As another example of a mechanism to select the two or more potential translation words, a thresholding mechanism with selecting words within a predetermined threshold distance in the target language semantic vector space may be used to select up to a predetermined number of potential translation words. After these potential translation words are identified, one out of these two or more potential translation words may be selected to be mapped to the word or phrase in the initial language as the translation of that word or phrase in the target language. This selection may be performed in accordance with the remaining procedures of method 300 by evaluating representations of the initial word or phrase in the target semantic vector space via various linguistic pathways relative to the semantic vectors of each of the two or more potential translation words in the target semantic space.

At block 312, at least one intermediary language may be selected and respective corresponding translation matrices between the initial language and the intermediary languages may identified, as well as respective corresponding translation matrices between the intermediary language and the target language. It will be appreciated that each of these matrices, when used for translation of a semantic vector representation in one semantic vector space (e.g., for a particular language) to another semantic vector space, may inject varying amounts of error, depending on the quality (e.g., number and distribution of seed words, number of dimensions, etc.) for generating each of these matrices. Indeed, the various errors resulting from translating words using each of these matrices may be different from each other and, in fact, may be independent of each other.

At block 314, a respective distance between the semantic vector representation of the word or phrase in the target language semantic vector space and each of the potential translation words or phrases may be determined. The distance between the semantic vector representation of the word or phrase to be translated via the direct pathway (e.g., initial language semantic vector translated to target semantic vector) may be determined relative to each of the potential translation word or phrase semantic vectors by any suitable mechanism. In some cases, cosine distance, dot product, straight subtraction, Euclidean distance, combinations thereof, or the like may be used to determine the distance.

At block 316, a multi-path translation representation of the word in the target language semantic vector space via each of the intermediary languages may be determined. This may be performed for each intermediary language by multiplying the semantic vector representation of the initial word or phrase in the initial language by the initial language-to-intermediary language translation matrix and the intermediary language-to-target language translation matrix for that intermediary language. In this way, a corresponding translation representation of the word or phrase may be determined for each of the multiple path (e.g., for each of the intermediary languages).

At block 318, a distance for each of the multi-path translation representation of the word or phrase in the target language to each of the potential translation words in the target language semantic vector space may be determined. This process may be similar to the processes of block 314. The distance corresponding to each of the pathways for transforming the semantic vector of the word or phrase from the initial semantic vector space to the target semantic vector space may be determined for each of the potential translation words and temporarily stored, such as in memory 210 for further processing, such as to calculate a cost function.

At block 320, a cost corresponding to each of the potential translation words may be determined based at least in part on a cost function, the distance for each multi-path translation of the word or phrase to each potential translation word or phrase, and the distance between the vector representation of the word in the target language and each of the potential translation words. As described above, the cost value corresponding to each of the two or more potential translation words in the target semantic vector space may be determined by any suitable mechanism (e.g., any suitable cost function). In example embodiments, the cost function may have different weightings ascribed to various pathways. In still further example embodiments, a pathway where the translation word has been mapped (e.g., either in a training phase with the set of seed words or subsequently mapped) may be accorded a greater weight than pathways without any translational legs where the word to be translated has previously been mapped. In yet further example embodiments, language pathways with the same or similar written script may be accorded a greater weight than translation pathways that do not have written script consistency. In still further example embodiments, similar language groups may be weighted more heavily than pathways with dissimilar linguistic family pathways. It should be noted that the example differential weightings in cost functions are examples. In other example embodiments, the weightings may be reversed, different, and/or combinations of those described above. In still further example embodiments, different pathways, and the costs associated therewith, may not be differentially weighted in the cost function(s) that may be used to select a target translated word for mapping purposes. At block 322, the potential translation word or phrase with the least cost may be determined to be the translation of the word or phrase in the target language.

It will be appreciated that the procedures of method 300 may use the independent or near-independent errors of various pathways for translating a word or phrase from an initial language to a target language to minimize errors in the mapping of the word or phrase from the initial language to the target language. For example, if ϵ represents the error (e.g., the distance of a particular translation pathway semantic vector from what should be the actual mapping) and if we assume that the error ϵ is the same for each of the pathways, independent of each other, and the cost function used has equal weighting for each of the pathways, then the expected error from a multi-path translation may be $$\varepsilon' = \frac{1}{\sqrt{n}}\varepsilon,$$

where n is me number of translation pathways. Therefore, assuming the aforementioned conditions, if one intermediary language pathway is used, then the expected error may drop by approximately 29%. If three intermediary language pathways are used, then the expected error may drop by approximately 50%.

In some example embodiments, the errors in a direct translation, as revealed during the execution of the method 300 may be used to modify (e.g., tweak) the initial language-to-target language translation matrix. For example, these errors may be discovered by the processes of block 314. Any variety of error minimization mechanisms may be used to tweak one or more components of the translation matrix between the initial language and the target language.

It should be noted, that the method 300 may be modified in various ways in accordance with certain embodiments of the disclosure. For example, one or more operations of method 300 may be eliminated or executed out of order in other embodiments of the disclosure. Additionally, other operations may be added to method 300 in accordance with other embodiments of the disclosure.

Figure 4:
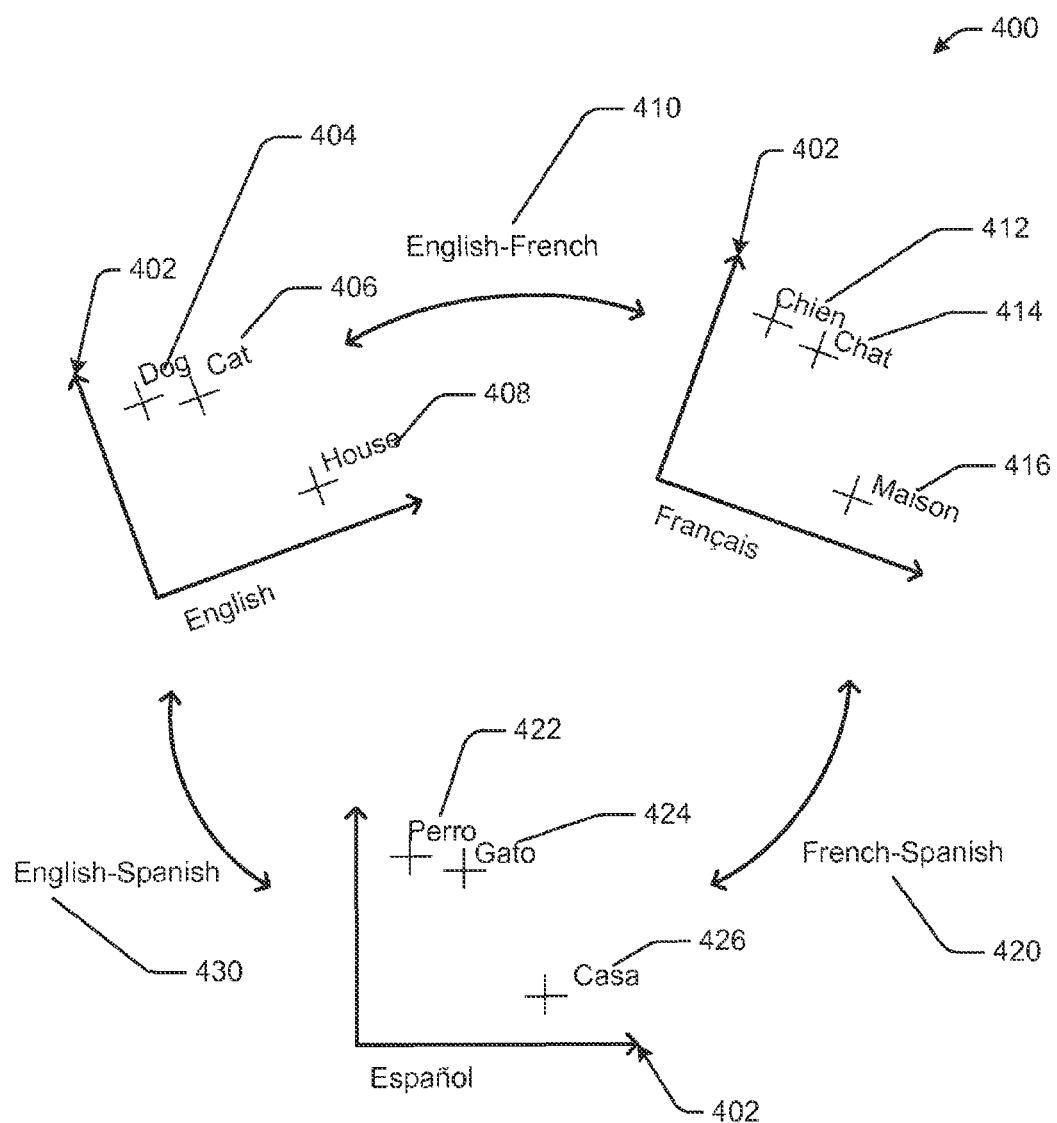
FIG. 4 depicts a schematic diagram illustrating translations of words between three languages, as represented in the semantic vector space translation between the three languages, in accordance with example embodiments of the disclosure.

FIG. 4 depicts a schematic diagram 400 illustrating translations of words 404, 406, 408, 412, 414, 416, 422, 424, 426 between three languages, as represented in the semantic vector space translation between the three languages, in accordance with example embodiments of the disclosure. As depicted here, the words 404, 406, 408 in one language, such as English may be represented as vectors in the English semantic vector space 402. Although this English semantic vector space 402 is depicted as a two-dimensional space for illustrative purposes, it will be appreciated that the English semantic vector space, or indeed any semantic vector space, may have any suitable number of dimensions and may indeed be hyper-dimensional (e.g., four or greater dimensions). For example, the English semantic vector space 402 may have 300 dimensions. In other examples, the English semantic vector space 402 may have 500 dimensions. As depicted here, a French-to-English transform 410 may be performed to represent the words 412, 414, 416 on the English semantic vector space 402. Similarly, a Spanish-to-English transform 430 may be performed to represent the words 422, 424, 426 on the English semantic vector space 402. Although the words 412, 414, 416 in French are true translations of the words 404, 406, 408, respectively, in English, due to potential errors in translations, the semantic vector representations of 412, 414, 416 may not perfectly overlie the semantic vector representations of the words 404, 406, 408 in the English semantic vector space 402. Similarly, although the words 422, 424, 426 in Spanish are true translations of the words 404, 406, 408, respectively, in English, due to potential errors in translations, the semantic vector representations of 422, 424, 426 may not perfectly overlie the semantic vector representations of the words 404, 406, 408 in the English semantic vector space 402. It should also be noted that a French-to-Spanish transform 420 may be used in conjunction with a French-to-English transform 410 to represent the words 422, 424, 426 in the English semantic vector space 402. This later pathway may be via an intermediary language (e.g., French).

Figure 5:
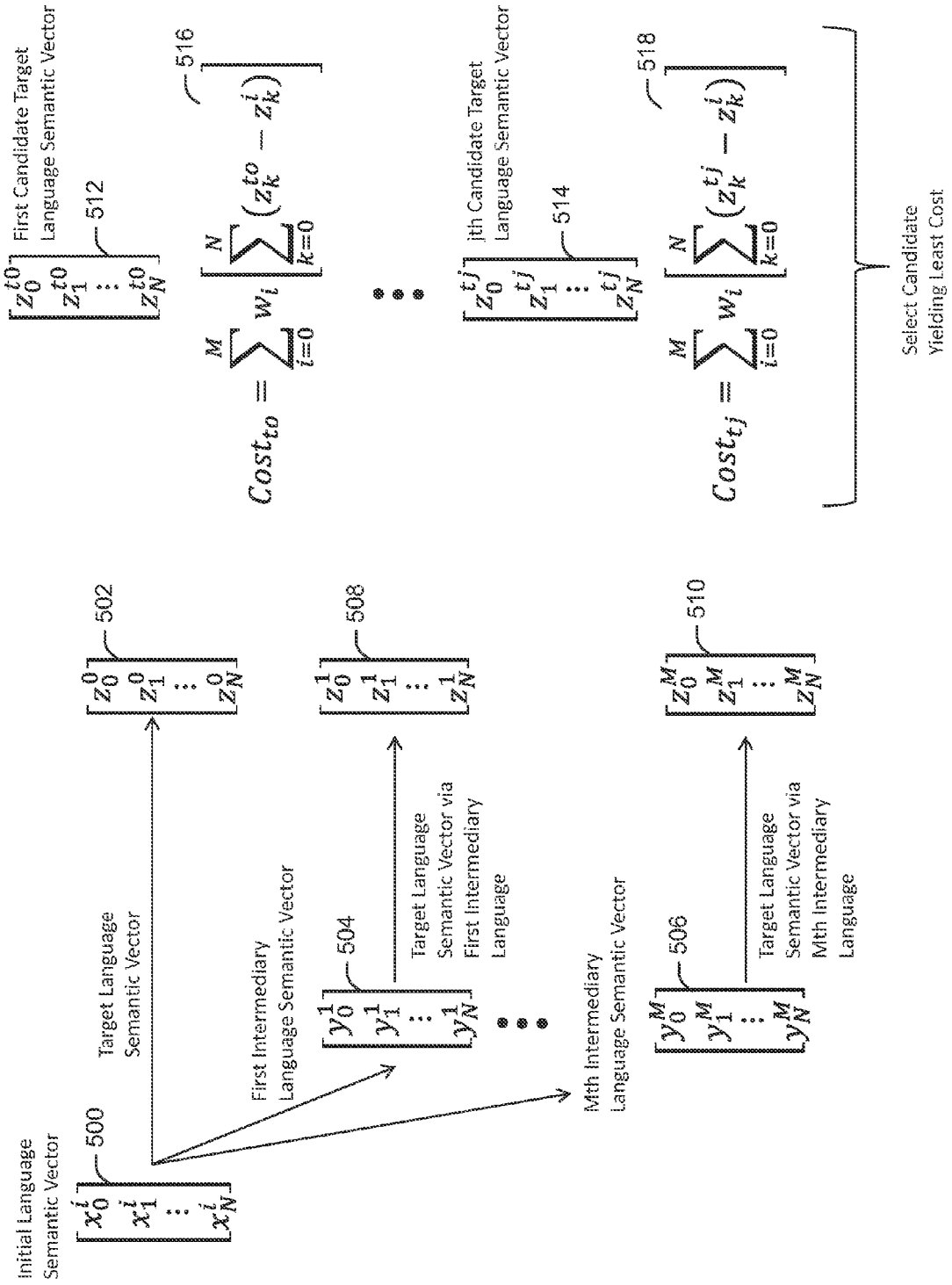
FIG. 5 depicts an example mechanism for selecting from more than one candidate word or phrase as the translation of a word or phrase from an initial language to a target language, in accordance with example embodiments of the disclosure.

FIG. 5 depicts an example mechanism for selecting from more than one candidate word or phrase as the translation of a word or phrase from an initial language to a target language, in accordance with example embodiments of the disclosure. This diagram may depict a particular implementation of the method 300 of FIG. 3. As shown, a semantic vector 500 of a word to be translated from an initial language to a target language may be determined. This initial language semantic vector 500 may be transformed to a target language semantic vector 502 of the word, such as by using an initial language-to-target language translation matrix. Additionally, a first through any number M intermediary languages may be selected for performing multiple translational pathways. The initial language semantic vector 500 may be transformed to a first intermediary language semantic vector 504 through the Mth intermediary language semantic vector 506. These intermediary semantic vectors 504, 506 may be determined by multiplying the initial language semantic vector 500 by translation matrices corresponding to each of the intermediary languages. The intermediary language semantic vectors 504, 506 may then be transformed to corresponding target language semantic vectors 508, 510. The target language semantic vectors 508, 510 may be determined by multiplying the corresponding intermediary language semantic vector 504, 506 by a translation matrix between the intermediary language and the target language for each of the intermediary languages. It will be appreciated that each of semantic vectors 502, 508, 510 are target language semantic vector representation of the initial word to be translated, that were derived via separate translational pathways.

Using the target language semantic vector 502, j number of potential target language semantic vectors 512, 514 may be identified. In example embodiments, these j semantic vectors in the target semantic vector space may be relatively proximal to one or more of the target language semantic vectors 502, 508, 510. A cost value 516, 518 may be determined corresponding to each of the potential target language semantic vectors 512, 514. The cost function as depicted here is just one example. Other cost functions that quantify a combination of the distances from multi-path target language semantic vectors 502, 508, 510 of the word to be translated from each of the potential target language semantic vectors 512, 514 may be used in accordance with example embodiments of the disclosure. The cost function, as depicted here may sum the difference in each of the dimensions between a particular target sematic vector representation of the word to be translated to the potential target language semantic vector for which the cost is being calculated. This procedure may be repeated for the particular potential target language semantic vector for each of the translation pathways. Then the results for each of the translation pathways may be weighted and summed. The potential target language semantic vector that yields a minimum cost value may be selected as the correct translation of the initial language semantic vector 500 into the target semantic vector space. The word corresponding to the selected potential target language semantic vector 512, 514 in the target language may be mapped to the word corresponding to the initial language semantic vector 500 in the initial language.

Figure 6:
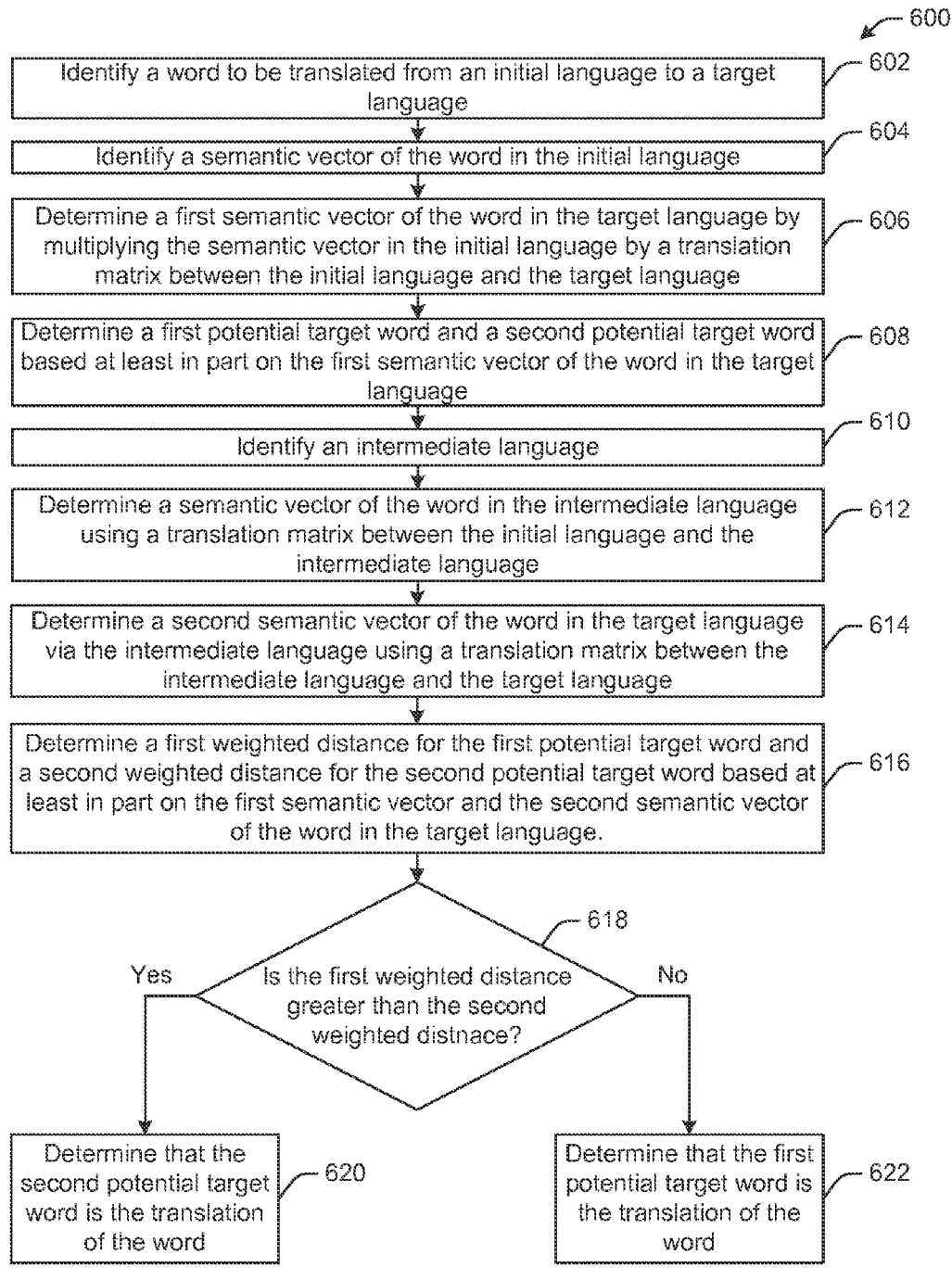
FIG. 6 depicts a flow diagram illustrating an example method for determining a translation of a word from an initial language into a target language using multi-path translation, in accordance with example embodiments of the disclosure.

FIG. 6 depicts a flow diagram illustrating an example method 600 for determining a translation of a word from an initial language into a target language using multi-path translation, in accordance with example embodiments of the disclosure. The method 600 may be performed by the translation service server 150 and the processor(s) 200 thereon in cooperation with one or more other entities of the environment 100. In alternative embodiments, the user device 130 may perform one, some or all of the processes of method 600, in accordance with example embodiments of the disclosure. The method 600 is an example embodiment where there is a single intermediary language. In other words, there may be two pathways to be considered in determining the appropriate candidate word for mapping to the initial word to be mapped. Furthermore, in method 600 there may be two candidate words in the target semantic vector space from which to choose the appropriate word for mapping purposes.

At block 602, a word to be translated from an initial language to a target language may be identified. In example embodiments, this word to be translated may not have been previously mapped from the initial language to the target language. In other words, the translation of this word between the initial language and the target language may not be known. In example embodiments, the word or phrase may not have been part of a set of seed words that may have been used to generate a translation matrix to translate between the initial language and the target language. In some example embodiments, the word to be translated may be part of and/or contained in the initial language document 120.

At block 604, a semantic vector of the word to be translated may be identified in the semantic vector space of the initial language. This semantic vector of the word to be translated may be determined by finding the semantic vector in a datastore (e.g., a look-up table). Alternatively, the semantic vector of the word in the initial language semantic vector space may be derived using models that may have been trained on an initial corpus of words mapped to their semantic representation.

At block 606, a first semantic vector of the word in the target language may be determined by multiplying the semantic vector in the initial language by a translation matrix between the initial language and the target language. At block 608, a first potential target word and a second potential target word may be determined based at least in part on the first semantic vector of the word in the target language. At block 610, an intermediate language may be identified. In example embodiments, the intermediate language may be selected on the basis of any variety of considerations. For example, the intermediate language may be selected such that it is of a similar linguistic type (Latin-based, Sanskrit-based, etc.) as either the initial language and/or the target language.

At block 612, a semantic vector of the word in the intermediate language may be determined using a translation matrix between the initial language and the intermediate language. At block 614, a second semantic vector of the word in the target language may be determined via the intermediate language using a translation matrix between the intermediate language and the target language. At block 616, a first weighted distance for the first potential target word and a second weighted distance for the second potential target word may be determined based at least in part on first semantic vector and the second semantic vector of the word in the target language.

At block 618, it may be determined if the first weighted distance is greater than the second weighted distance. If it is determined that the first weighted distance is indeed greater than the second weighted error, then, at block 620, it may be determined that the second potential target word is the translation of the word. If however, at block 618, it was determined that the first weighted distance was not greater than the second weighted distance, then at block 622, it may be determined that the first potential target word is the translation of the word. In some example embodiments, the errors in a direct translation, as revealed during the execution of the method 600 may be used to modify (e.g., tweak) the initial language-to-target language translation matrix.

It should be noted, that the method 600 may be modified in various ways in accordance with certain embodiments of the disclosure. For example, one or more operations of method 600 may be eliminated or executed out of order in other embodiments of the disclosure. Additionally, other operations may be added to method 600 in accordance with other embodiments of the disclosure.

Figure 7:
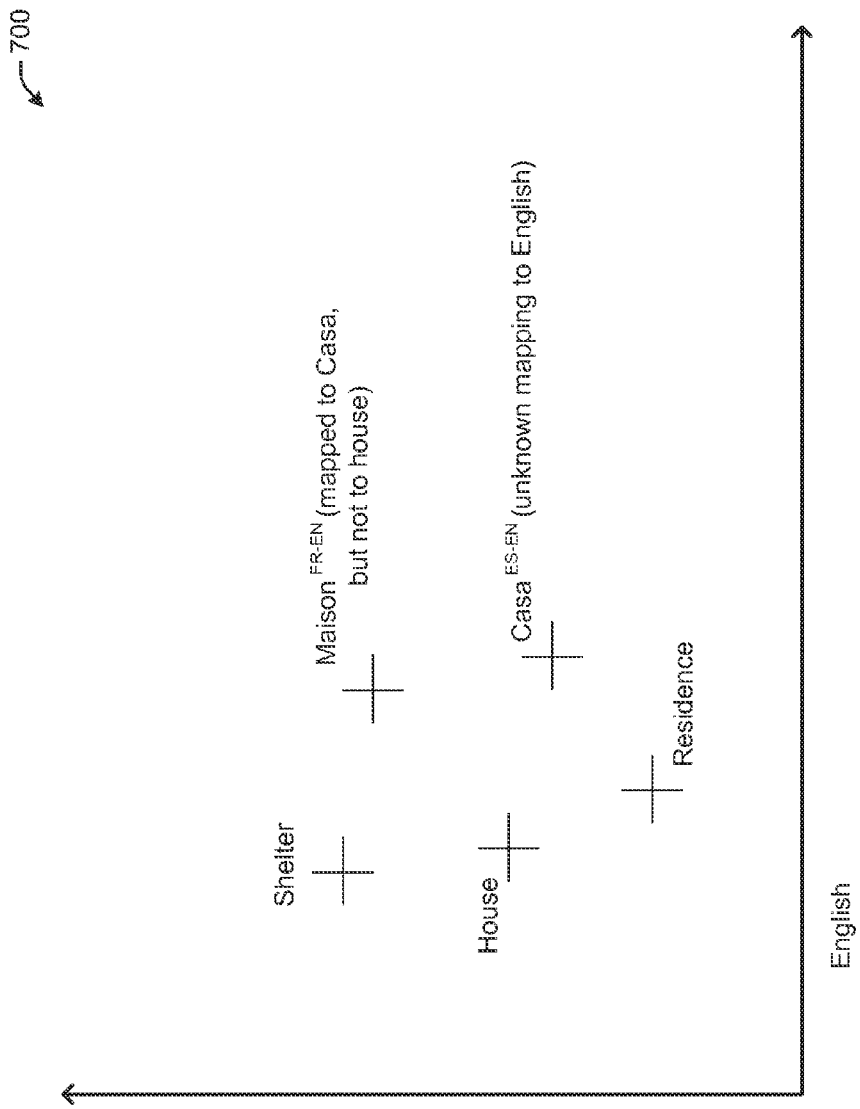
FIG. 7 depicts a schematic diagram illustrating an example translation of a word from Spanish to English with French as an intermediary language, where the word has been mapped between Spanish and French, but not between French and English, in accordance with example embodiments of the disclosure.
Figure 8:
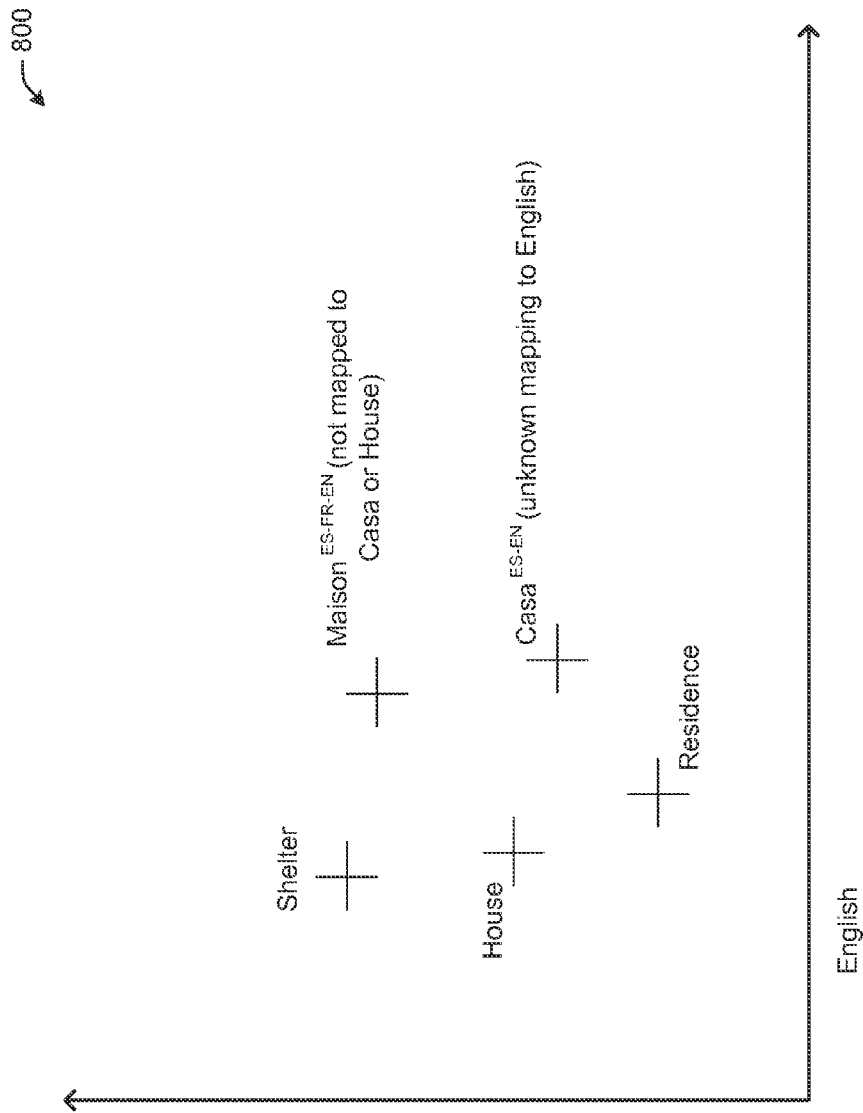
FIG. 8 depicts a schematic diagram illustrating an example translation of a word from Spanish to English with French as an intermediary language, where the word has not been mapped between Spanish and French or between French and English, in accordance with example embodiments of the disclosure.

FIG. 7 depicts a schematic diagram 700 illustrating an example translation of a word from Spanish to English with French as an intermediary language, where the word has been mapped between Spanish and French, but not between French and English, in accordance with example embodiments of the disclosure. FIG. 8 depicts a schematic diagram 800 illustrating an example translation of a word from Spanish to English with French as an intermediary language, where the word has not been mapped between Spanish and French or between French and English, in accordance with example embodiments of the disclosure. In both FIGS. 7 and 8, regardless of whether the Spanish word to be translated (e.g., casa) had been mapped between French and English (e.g., maison mapped to house) there may be benefits to using the multi-path translation methods and systems, as described herein. A two-dimensional semantic vector space (e.g., English semantic vector space) is depicted here for illustrative purposes.

As shown, the semantic vector representation of "casa" (Spanish for "house") in the English semantic vector space by a direct pathway (e.g., Spanish-English pathway) may be most proximal to the word "residence." Using a different and indirect pathway (e.g., Spanish-French-English pathway), the resulting semantic vector may be most proximal to the word "shelter." Thus, using either of these pathways (e.g., Spanish-English or Spanish-French-English) may result in an erroneous mapping of the Spanish word "casa." However, if both of the pathways are considered in conjunction with each other, it may be found that the word "house" may be most proximal to an average of the semantic vectors resulting from the two separate pathways. Therefore, by performing a multi-path mapping, a correct result may be obtained that may not otherwise be obtained via a uni-path mapping.

Embodiments described herein may be implemented using hardware, software, and/or firmware, for example, to perform the methods and/or operations described herein. Certain embodiments described herein may be provided as one or more tangible machine-readable media storing machine-executable instructions that, if executed by a machine, cause the machine to perform the methods and/or operations described herein. The tangible machine-readable media may include, but is not limited to, any type of disk including floppy disks, optical disks, compact disk read-only memories (CD-ROMs), compact disk rewritable (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of tangible media suitable for storing electronic instructions. The machine may include any suitable processing or computing platform, device or system and may be implemented using any suitable combination of hardware and/or software. The instructions may include any suitable type of code and may be implemented using any suitable programming language. In other embodiments, machine-executable instructions for performing the methods and/or operations described herein may be embodied in firmware. Additionally, in certain embodiments, a special-purpose computer or a particular machine may be formed in order to identify actuated input elements and process the identifications.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

While certain embodiments of the invention have been described in connection with what is presently considered to be the most practical and various embodiments, it is to be understood that the invention is not to be limited to the disclosed embodiments, but on the contrary, is intended to cover various modifications and equivalent arrangements included within the scope of the claims. Although specific terms are employed herein, they are used in a generic and descriptive sense only, and not for purposes of limitation.

This written description uses examples to disclose certain embodiments of the invention, including the best mode, and also to enable any person skilled in the art to practice certain embodiments of the invention, including making and using any devices or systems and performing any incorporated methods. The patentable scope of certain embodiments of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

In accordance with example embodiments of the disclosure, there may be one or more non-transitory computer-readable media comprising computer-executable instructions that, when executed by one or more processors, configure the one or more processors to perform operations including identifying a word in an initial language to be translated to a target language; determining a first target semantic vector of the word in a target language semantic vector space; determining a second target semantic vector of the word in the target language semantic vector space based at least in part on an first translation matrix and a second translation matrix; identifying a first potential semantic vector in the second language semantic vector space corresponding to a first potential word in the second language; identifying a second potential semantic vector in the second language semantic vector space corresponding to a second potential word in the second language; determining a first cost value corresponding to the first potential semantic vector based at least in part on a cost function, the first target semantic vector, and the second target semantic vector; determining a second cost value corresponding to the second potential semantic vector based at least in part on the cost function, the first target semantic vector, and the second target semantic vector; and determining that the first potential word is to be mapped to the word as the translation of the word in the target language. In example embodiments the operations may further include determining an initial semantic vector of the word in an initial language semantic vector space; and identifying an initial language to target language translation matrix, wherein determining the first target semantic vector of the word comprises multiplying the initial semantic vector of the word by the initial language to target language translation matrix. The first translation matrix may be a translation matrix between an initial language semantic vector space and an intermediate language semantic vector space, and the second translation matrix may be a translation matrix between the intermediate language semantic vector space and the target language semantic vector space, and wherein determining the second target semantic vector of the word comprises determining an initial semantic vector of the word in the initial language semantic vector space; and multiplying the initial semantic vector by the first translation matrix and the second translation matrix.

In yet further example embodiments, identifying the first potential semantic vector comprises determining a distance between the first target semantic vector and the first potential semantic vector; and determining that the distance is less than a threshold distance. In still further example embodiments, determining the distance between the first target semantic vector and the first potential semantic vector comprises determining at least one of: (i) a cosine distance between the first target semantic vector and the first potential semantic vector, or (ii) an Euclidean distance between the first target semantic vector and the first potential semantic vector. Further still, the distance may be a first distance and wherein determining the first cost value corresponding to the first potential semantic vector comprises determining a second distance between the second target semantic vector and the first potential semantic vector; and combining the first distance with the second distance according to the cost function. In further example embodiments, operations further comprise identifying a third potential semantic vector in the second language semantic vector space corresponding to a third potential word in the second language; determining a third cost value corresponding to the third potential semantic vector based at least in part on the cost function, the first target semantic vector, and the second target semantic vector; and determining that the third cost value is greater than the first cost value. In yet further example embodiments, the operations further comprise determining a third target semantic vector of the word in the target language semantic vector space based at least in part on an third translation matrix and a fourth translation matrix, wherein determining the first cost value corresponding to the first potential semantic vector is further based at least in part on the third target semantic vector.

In accordance with example embodiments of the disclosure, there may be a system. The system may comprise at least one memory that stores computer-executable instructions; and at least one processor is configured to access the at least one memory and is configured to execute the computer-executable instructions to determine a first target semantic vector of a word in a target language semantic vector space via a direct path, wherein the word is to be translated from an initial language to a target language, the target language corresponding to the target language semantic vector space; determine a second target semantic vector of the word in the target language semantic vector space via an indirect path; identify a first potential semantic vector in the second language semantic vector space corresponding to a first potential word in the second language; identify a second potential semantic vector in the second language semantic vector space corresponding to a second potential word in the second language; determine a first distance between the first target semantic vector and the first potential semantic vector; determine a second distance between the second target semantic vector and the first potential semantic vector; determine a third distance between the first target semantic vector and the second potential semantic vector; determine a fourth distance between the second target semantic vector and the second potential semantic vector; and determine that the first potential word is to be mapped to the word as the translation of the word in the target language based at least in part on the first distance, the second distance, the third distance, and the fourth distance. In further example embodiments the at least one processor is further configured to execute the computer-executable instructions to determine a first cost value based at least in part on the first distance, the second distance, and a cost function; and determine a second cost value based at least in part on the third distance, the fourth distance, and the cost function, wherein to determine that the first potential word is to be mapped to the word comprises determining that the first cost value is less than the second cost value. In still further example embodiments, the at least one processor is further configured to execute the computer-executable instructions to determine an initial semantic vector of the word in an initial language semantic vector space; and identify an initial language to target language translation matrix, wherein to determine the first target semantic vector of the word comprises multiplying the initial semantic vector of the word by the initial language to target language translation matrix.

In yet further example embodiments, the at least one processor is further configured to execute the computer-executable instructions to modify the initial language to target language translation matrix based at least in part on the first distance. In further example embodiments, the at least one processor configured to determine the second target semantic vector of the word comprises the at least one processor configured to determine an initial semantic vector of the word in the initial language semantic vector space;

and multiplying the initial semantic vector by an initial language to intermediate language translation matrix and an intermediate language to target language translation matrix. According to example embodiments, the at least one processor is further configured to execute the computer-executable instructions to identify the word from a document to be translated from the initial language to the target language, wherein the document is at least one of a text-based file or an audio file. In accordance with embodiments of the disclosure, the at least one processor configured to identify the first potential semantic vector comprises the at least one processor configured to determine that the first distance is less than a threshold distance. Further still, the indirect path is a first indirect path and wherein the at least one processor is further configured to execute the computer-executable instructions to determine a third target semantic vector of the word in the target language semantic vector space via a second indirect path; determine a fifth distance between the third target semantic vector and the first potential semantic vector; and determine a sixth distance between the third target semantic vector and the second potential semantic vector, wherein to determine that the first potential word is to be mapped to the word as the translation of the word in the target language is further based at least in part on the fifth distance and the sixth distance.

In accordance with example embodiments of the disclosure, there may be a method. The method may include identifying, by one or more computer processors, a word in an initial language to be translated to a target language; determining, by the one or more computer processors, an initial semantic vector of the word in an initial language semantic vector space; identifying, by the one or more computer processors, an initial language to target language translation matrix; determining, by the one or more computer processors, a first target semantic vector of the word in a target language semantic vector space based at least in part on the initial semantic vector of the word and the initial language to target language translation matrix; determining, by the one or more computer processors, a second target semantic vector of the word in the target language semantic vector space based at least in part on an first translation matrix and a second translation matrix; identifying, by the one or more computer processors, a first potential semantic vector in the second language semantic vector space corresponding to a first potential word in the second language; identifying, by the one or more computer processors, a second potential semantic vector in the second language semantic vector space corresponding to a second potential word in the second language; determining, by the one or more computer processors, a first cost value corresponding to the first potential semantic vector based at least in part on a cost function, the first target semantic vector, and the second target semantic vector; determining, by the one or more computer processors, a second cost value corresponding to the second potential semantic vector based at least in part on the cost function, the first target semantic vector, and the second target semantic vector; and determining, by the one or more computer processors, that the first potential word is to be mapped to the word as the translation of the word in the target language.

In example embodiments, the first translation matrix is a translation matrix between an initial language semantic vector space and an intermediate language semantic vector space, and the second translation matrix is a translation matrix between the intermediate language semantic vector space and the target language semantic vector space, and wherein determining the second target semantic vector of the word comprises determining, by the one or more computer processors, an initial semantic vector of the word in the initial language semantic vector space; and multiplying, by the one or more computer processors, the initial semantic vector by the first translation matrix and the second translation matrix. Further example embodiments may include determining, by the one or more computer processors, a third target semantic vector of the word in the target language semantic vector space based at least in part on an third translation matrix and a fourth translation matrix, wherein determining the first cost value corresponding to the first potential semantic vector is further based at least in part on the third target semantic vector. Further still, example embodiments may include identifying, by the one or more computer processors, a third potential semantic vector in the second language semantic vector space corresponding to a third potential word in the second language; determining, by the one or more computer processors, a third cost value corresponding to the third potential semantic vector based at least in part on the cost function, the first target semantic vector, and the second target semantic vector; and determining, by the one or more computer processors, that the third cost value is greater than the first cost value.

The claimed invention is:

1. One or more non-transitory computer-readable media comprising computer-executable instructions that, when executed by one or more processors associated with a server, cause the one or more processors to:
   identify, a document received from a device over a network;
   identify a word from the document in an initial language to be translated to a target language;
   determine a first target semantic vector of the word in a target language semantic vector space;
   determine a second target semantic vector of the word in the target language semantic vector space based at least in part on a first translation matrix;
   identify, based on the first target semantic vector, a first potential word in the target language and a second potential word in the target language;
   identify a first potential semantic vector in the target language semantic vector space corresponding to the first potential word in the target language based on the second target semantic vector;
   identify a second potential semantic vector in the target language semantic vector space corresponding to the second potential word in the target language based on the second target semantic vector;
   determine a first cost value corresponding to the first potential semantic vector based at least in part on a cost function, the first target semantic vector, and the second target semantic vector;
   determine a second cost value corresponding to the second potential semantic vector based at least in part on the cost function, the first target semantic vector, and the second target semantic vector;
   determine that the first potential word is to be mapped to the word as the translation of the word in the target language based on the first cost value and the second cost value;
   generate a second document including the translation of the word in the target language; and
   cause the second document to be transmitted over the network to the device.

2. The one or more non-transitory computer-readable media of claim 1, wherein the instructions further cause the one or more processors to:

determine an initial semantic vector of the word in an initial language semantic vector space; and identify an initial language to target language translation matrix, the instructions cause the one or more processors to determine the first target semantic vector of the word by multiplying the initial semantic vector of the word by the initial language to target language translation matrix.

3. The one or more non-transitory computer-readable media of claim 1, wherein the first translation matrix is a translation matrix between an initial language semantic vector space and an intermediate language semantic vector space, and wherein the instructions cause the one or more processors to determine the second target semantic vector of the word by:

determining an initial semantic vector of the word in the initial language semantic vector space; and multiplying the initial semantic vector by (1) the first translation matrix and (2) a second translation matrix, wherein the second translation matrix is between the intermediate language semantic vector space and the target language semantic vector space.

4. The one or more non-transitory computer-readable media of claim 1, wherein the instructions cause the one or more processors to identify the first potential semantic vector by:

determining a distance between the first target semantic vector and the first potential semantic vector; and determining that the distance is less than a threshold distance.

5. The one or more non-transitory computer-readable media of claim 4, wherein the instructions cause the one or more processors to determine the distance between the first target semantic vector and the first potential semantic vector by determining at least one of: (i) a cosine distance between the first target semantic vector and the first potential semantic vector, or (ii) a Euclidean distance between the first target semantic vector and the first potential semantic vector.

6. The one or more non-transitory computer-readable media of claim 4, wherein the distance is a first distance and the instructions cause the one or more processors to determine the first cost value corresponding to the first potential semantic vector by:

determining a second distance between the second target semantic vector and the first potential semantic vector; and combining the first distance with the second distance according to the cost function.

7. The one or more non-transitory computer-readable media of claim 1, wherein the instructions cause the one or more processors to:

identify a third potential semantic vector in the target language semantic vector space corresponding to a third potential word in the target language;

determine a third cost value corresponding to the third potential semantic vector based at least in part on the cost function, the first target semantic vector, and the second target semantic vector; and determine that the third cost value is greater than the first cost value.

8. The one or more non-transitory computer-readable media of claim 1, wherein the instructions cause the one or more processors to:

determine a third target semantic vector of the word in the target language semantic vector space based at least in part on an third translation matrix and a fourth translation matrix; and determine the first cost value corresponding to the first potential semantic vector based at least in part on the third target semantic vector.

9. A server to receive a document from a device over a network, the server comprising:

at least one memory that stores computer-executable instructions; and at least one processor to access the at least one memory and execute the computer-executable instructions to:

determine a first target semantic vector of a word from the document in a target language semantic vector space via a direct path, the word to be translated from an initial language to a target language, the target language corresponding to the target language semantic vector space;

determine a second target semantic vector of the word in the target language semantic vector space via an indirect path;

identify, based on the first target semantic vector, a first potential word in the target language and a second potential word in the target language;

identify a first potential semantic vector in the target language semantic vector space corresponding to the first potential word in the target language;

identify a second potential semantic vector in the target language semantic vector space corresponding to the second potential word in the target language;

determine a first distance between the first target semantic vector and the first potential semantic vector;

determine a second distance between the second target semantic vector and the first potential semantic vector;

determine a third distance between the first target semantic vector and the second potential semantic vector;

determine a fourth distance between the second target semantic vector and the second potential semantic vector;

determine that the first potential word is to be mapped to the word as a translation of the word in the target language based at least in part on the first distance, the second distance, the third distance, and the fourth distance;

generate a second document including the translation of the word in the target language; and cause the second document to be transmitted over the network to the device.

10. The server of claim 9, wherein the at least one processor is further to execute the computer-executable instructions to:

determine a first cost value based at least in part on the first distance, the second distance, and a cost function; and determine a second cost value based at least in part on the third distance, the fourth distance, and the cost function, wherein the at least one processor is to determine the first potential word is to be mapped to the word when the first cost value is less than the second cost value.

11. The server of claim 9, wherein the at least one processor is further to execute the computer-executable instructions to:
- determine an initial semantic vector of the word in an initial language semantic vector space;
- identify an initial language to target language translation matrix; and
- the at least one processor is to determine the first target semantic vector of the word by multiplying the initial semantic vector of the word by the initial language to target language translation matrix.

12. The server of claim 11, wherein the at least one processor is further to execute the computer-executable instructions to modify the initial language to target language translation matrix based at least in part on the first distance.

13. The server of claim 9, wherein the at least one processor is to determine the second target semantic vector of the word by
- determining an initial semantic vector of the word in an initial language semantic vector space; and
- multiplying the initial semantic vector by an initial language to intermediate language translation matrix and an intermediate language to target language translation matrix.

14. The server of claim 9, wherein the at least one processor is further to execute the computer-executable instructions to identify the word from a document to be translated from the initial language to the target language, the document at least one of a text-based file or an audio file.

15. The server of claim 9, wherein the at least one processor is to identify the first potential semantic vector by determine that the first distance is less than a threshold distance.

16. The server of claim 9, wherein the indirect path is a first indirect path and the at least one processor is further to execute the computer-executable instructions to:
- determine a third target semantic vector of the word in the target language semantic vector space via a second indirect path;
- determine a fifth distance between the third target semantic vector and the first potential semantic vector; and
- determine a sixth distance between the third target semantic vector and the second potential semantic vector, the at least one processor to determine the first potential word is to be mapped to the word as a translation of the word in the target language based at least in part on the fifth distance and the sixth distance.

17. A method, comprising:
- determining, by executing an instruction with one or more computer processors, an initial semantic vector of a word in an initial language semantic vector space, the word contained in a document to be translated from an initial language to a target language;
- identifying, by executing an instruction with the one or more computer processors, an initial language to target language translation matrix;
- determining, by executing an instruction with the one or more computer processors, a first target semantic vector of the word in a target language semantic vector space based at least in part on the initial semantic vector of the word and the initial language to target language translation matrix;
- determining, by executing an instruction with the one or more computer processors, a second target semantic vector of the word in the target language semantic vector space based at least in part on a first translation matrix;
- identifying, by executing an instruction with the one or more computer processors, a first potential word in the target language and a second potential word in the target language, the first and second potential words identified based on the first target semantic vector;
- identifying, by executing an instruction with the one or more computer processors, a first potential semantic vector in the target language semantic vector space corresponding to the first potential word in the target language based on the second target semantic vector;
- identifying, by executing an instruction with the one or more computer processors, the second potential semantic vector in the target language semantic vector space corresponding to a second potential word in the target language;
- determining, by executing an instruction with the one or more computer processors, a first cost value corresponding to the first potential semantic vector based at least in part on a cost function, the first target semantic vector, and the second target semantic vector;
- determining, by executing an instruction with the one or more computer processors, a second cost value corresponding to the second potential semantic vector based at least in part on the cost function, the first target semantic vector, and the second target semantic vector;
- determining, by executing an instruction with the one or more computer processors, that the first potential word is to be mapped to the word as the translation of the word in the target language based on the first cost value and the second cost value;
- generating, by executing an instruction with the one or more computer processors, a second document including the translation of the word in the target language; and
- causing, by executing an instruction with the one or more computer processors, the second document to be transmitted over the network to the device.

18. The method of claim 17, wherein the first translation matrix is a translation matrix between an initial language semantic vector space and an intermediate language semantic vector space, and
determining the second target semantic vector of the word includes:
- determining an initial semantic vector of the word in the initial language semantic vector space; and
- multiplying the initial semantic vector by (1) the first translation matrix and (2) a second translation matrix, wherein the second translation matrix is a translation matrix between the intermediate language semantic vector space and the target language semantic vector space.

19. The method of claim 17, further including:
determining a third target semantic vector of the word in the target language semantic vector space based at least in part on a third translation matrix and a fourth translation matrix, the determining of the first cost value corresponding to the first potential semantic vector based at least in part on the third target semantic vector.

20. The method of claim 17, further including:
- identifying a third potential semantic vector in the target language semantic vector space corresponding to a third potential word in the target language;
- determining a third cost value corresponding to the third potential semantic vector based at least in part on the cost function, the first target semantic vector, and the second target semantic vector; and
- determining that the third cost value is greater than the first cost value.

* * * * *